O. SAUGSTAD.
REGULATOR.
APPLICATION FILED SEPT. 8, 1906.

WITNESSES:
G. A. Klimek
Y. S. Andrews Jr.

INVENTOR
Olaf Saugstad
BY
Chapin & Hayward
his ATTORNEYS

UNITED STATES PATENT OFFICE.

OLAF SAUGSTAD, OF PLAINFIELD, NEW JERSEY, ASSIGNOR TO H. & M. AUTOMATIC REGULATOR COMPANY, A CORPORATION OF NEW YORK.

REGULATOR.

No. 896,588.      Specification of Letters Patent.      Patented Aug. 18, 1908.

Application filed September 8, 1906. Serial No. 333,750.

*To all whom it may concern:*

Be it known that I, OLAF SAUGSTAD, a citizen of the United States of America, and a resident of Plainfield, county of Union, State of New Jersey, have invented certain new and useful Improvements in Regulators, of which the following is a specification, reference being had to the accompanying drawings, forming a part thereof.

My invention relates to improvements in regulators, and particularly to improvements in hot water regulators.

The objects of my invention are to simplify and improve regulators of this description; to provide means whereby access may be readily had to the interior of the instrument without it becoming necessary to remove the instrument from the place in which it is employed; and to provide for the ready adjustment of the valve mechanism of the instrument, whereby the same may be caused to operate at different degrees of temperature, as may be desired.

To these ends my invention consists in certain novel details of construction and combination of parts as will hereinafter be fully set forth, and, in order that my invention may be thoroughly understood, I will describe an embodiment thereof with reference to the accompanying drawings illustrating same, and will then point out the novel features in claims.

Figure 1:
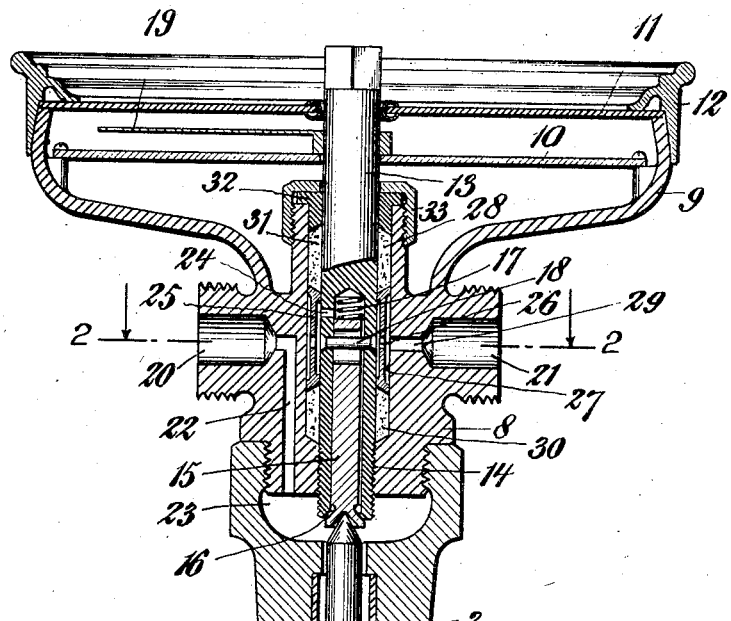
Figure 2:
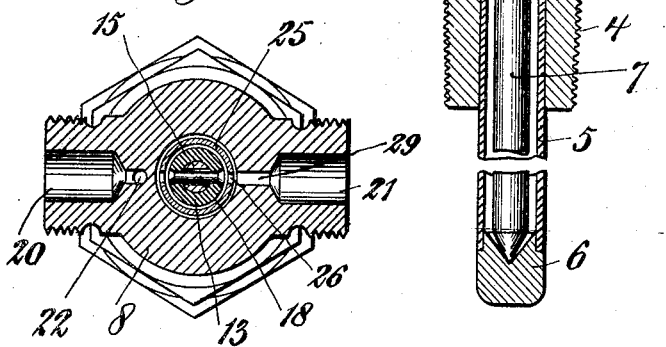

In the drawings: Figure 1 is a view in central longitudinal section through the instrument. Fig. 2 is a view in transverse section therethrough, the plane of section being taken substantially upon the line 2—2 of Fig. 1.

Referring to the drawings by reference characters, 3 designates a socket member which is adapted to be secured to a tank or other liquid holding means, the said socket member being provided with a screw-threaded portion for this purpose. Secured to the said socket member and projecting longitudinally therefrom is a tube 5, which constitutes one member of a thermostat. The said tube is closed at its outer end by means of a cap 6 rigidly secured thereto, as by brazing, and a longitudinal bar or rod 7 is contained within the said tube, the outer end of the said bar or rod arranged in contact with the said cap 6. The bar or rod 7 comprises the other member of the thermostat, the said bar or rod 7 and tube 5 being composed of materials having different co-efficients of expansion, whereby the relative movements between their inner ends, upon contraction or expansion, may be employed to operate valve mechanism.

The valve mechanism is mounted in a casing 8, said casing secured rigidly to the socket member 3 at one end, and at the other end provided with an outwardly flared portion 9 constituting an inclosing shell for a dial plate 10. The shell 9 is closed by means of a celluloid or glass disk 11 arranged opposite the dial plate 10, a cap 12 being employed for holding the said disk in position.

A stem 13 is adjustably mounted in the casing 8, a screw-threaded connection 14 being employed so that, by revolving the said stem 13, a movement thereof will be obtained toward and away from the thermostatic bar 7. The said stem 13 carries a valve 15, the stem of which is mounted concentrically in a central bore therein. The end of the stem 13 is finished off in the form of a valve seat 16, the face of the valve 15 being fitted thereto. The valve 15 is held normally against the end of the bar 7, so that it shall partake of the movements of that end of the bar, by means of a spring 17 which is housed within the said stem 13 between the inner end of the bore thereof and the end of the stem of the said valve 15. A pin 18, secured to the stem 13 and extending across the bore thereof, through a slotted portion in the stem of the valve 15, limits the outward movements of the valve 15, so that the said valve will be held in its position in the stem 13 at all times even when the said stem is entirely removed from the casing. Adjustment of the stem in the casing 8, by rotative movement applied thereto, will, as will be well understood, effect an adjustment of the valve with respect to the thermostatic operating mechanism therefor, whereby the same may be caused to operate at the desired temperature; and an indicating hand 19 is provided upon the stem 13 which may be employed to register with graduations on the dial plate 10 to correctly indicate the temperature at which the valve will be operated, all in a manner well understood by those skilled in this art. The valve casing 8 is provided with two connections, one an inlet connection 20, and the other an outlet 21. The inlet connection is provided with a port or passage 22 which leads to a chamber 23 contained between the end of the valve casing 8 and the interior of the socket member. The connection 20 may be connected with a constant supply of motive fluid, which, when the said valve 16 is raised from its seat, will pass from the port or passage 22 and chamber 23, along the stem of the valve 15 through the bore of the stem 13, thence through a passage 24 near the base of the bore of the said stem 13, to the exterior thereof. Thence the fluid will pass around the stem 13 in an annular chamber formed between the outer wall of the stem 13 and the inner wall of a follower 25. The said follower 25 has one or more openings 26 therein through which the fluid will then pass, the same passing thence through an annular chamber 27 formed between the outer walls of the follower 25 and the inner walls of a central bore 28 in the casing 8. Thence the motive fluid will pass through a port or passage 29 into the connection 21, from which it may be conveyed through suitable piping or otherwise to a motor or any other device to be operated. Packing 30 and 31 is provided in the bore 28 above and below the follower 25, the said follower being disposed freely between the two lots of packing, and a gland 32 and nut 33 are provided for pressing the packing firmly into place.

The packing 30 prevents escape of motive fluid past the screw-threaded connection 14, while the packing 31 prevents escape of motive fluid past the upper end of the stem 13. I consider this construction an important one as it permits all the operation of adjusting, removing or replacing of the stem to take place from the upper or outer end of the device. The importance of this will be understood when it is realized that removal of the instrument from the tank would ordinarily compel emptying the tank, and often an entire heating system, of water, in order to prevent escape of water through the opening to which the screw-threaded portion 4 is fitted. With the present arrangement it is not necessary to remove the instrument in order to obtain access to all the working parts, and hence it is not even necessary to break the pipe joints of the connection 20 and 21. The stem 13 may be adjusted at any time, and may be removed and replaced at will without dismantling the instrument, and, similarly, access may be had to the packing and the follower, all of which parts may be entirely removed and replaced without breaking any of the pipe connections, by merely slipping off the cap 12 and disk 11 and removing the dial plate 10. Removal of the stem 13 will remove with it the valve 15, and, as the parts will, of course, be made interchangeable, another stem may be inserted in place of the stem removed, so that, in case the valve 15 has been damaged, or the valve face or seat thereof is worn, new parts may be fitted in place with a minimum loss of time.

What I claim is:

1. A regulator comprising thermostatic valve operating means, a casing, a stem adjustably and removably fitted to said casing, said stem being provided with a valve seat, a valve fitted to and carried by said stem, said valve adapted to be engaged by said thermostatic means, packing between said stem and said casing located near the valve seat end of the stem, a follower comprising a thimble loosely strung upon the stem, packing above said follower between the stem and the casing, and means including an adjustable gland engaging the last said packing, whereby the adjustment of said gland will simultaneously adjust both said packings, said means accessible from that side of the casing furthest away from the thermostatic means, the said follower, casing and stem having connecting ports or passages located between the two said packings, substantially as set forth.

2. A regulator comprising a socket member 3, a thermostatic tube 5, a thermostatic bar 7 contained therein, a valve casing 8 secured to said socket member, a stem 13 adjustably fitted to said valve casing 8 by a screw-threaded connection 14, a valve 15 fitted to a bore in said stem, said valve arranged to engage a valve seat 16 with which said stem is provided, a spring 17, packing 30, a follower 25 loosely strung upon the stem, other packing 31, and means including an adjustable gland 32 for securing said packing in position and for simultaneously adjusting both the said packings, the said casing member 8 having an inlet passage 22 and an outlet passage 29, the said stem having a port or passage 24, and the follower provided with passages adapted to connect the said port or passage 24 with the outlet port or passage 29, substantially as set forth.

OLAF SAUGSTAD.

Witnesses:
D. HOWARD HAYWOOD,
LYMAN S. ANDREWS, Jr.